United States Patent Office 3,108,126
Patented Oct. 22, 1963

---

3,108,126
PROCESS OF MAKING POLYBUTYL TIN SULFIDES
Marc Jean Crauland, Paris, France, assignor to Compagnie de Saint-Gobain, Paris, France
No Drawing. Filed Jan. 11, 1957, Ser. No. 633,532
Claims priority, application France Sept. 16, 1954
6 Claims. (Cl. 260—429.7)

This application is a continuation-in-part of my application, Serial No. 533,909, filed September 12, 1955.

This invention relates to stabilized polyvinyl chloride, to stabilized halogenated vinyl resins; to stabilized resins containing halogen attached to a group $>C=C<$; to novel stabilizers for polyvinyl chloride and such other resins; and to novel methods of making such stabilizers.

These stabilizers protect the resins stabilized against heat and against decomposition by heat and are used by incorporating them with the resin in a stabilizing quantity. The halogenated vinyl resins are particularly adapted to stabilization by this means and these stabilizers may be used with all such resins, but polyvinyl chloride is particularly benefited by the incorporation of these stabilizers. These stabilizers are so efficient with polyvinyl chloride that they permit polyvinyl chloride to be worked by methods and apparatus which could not previously be employed successfully. The invention will be described in its application to the stabilization of polyvinyl chloride, and with particular relation to a new method for preparing the stabilizer, but it is understood that the particular description is not a limitation on the generality of which is claimed herein.

The stabilizers are the alkyl tin sulfides, more particularly dialkyl tin sulfides and trialkyl tin sulfides. The sulfides of ethyl and propyl tin are known as chemical compounds, but not as stabilizers so far as I know. We have successfully employed them as stabilizers and in addition have made new compounds which have exceptional stabilizing efficiency. These are the dibutyl and tributyl tin sulfides. The new alkyl tin sulfides in which the alkyl radical is butyl have proved to be particularly efficient stabilizers, but their particular efficiency does not impose a limitation upon the utility of the other lower alkyl tin sulfides. Lower alkyl tin sulfides, those in which the alkyl groups contain from four to ten carbon atoms per group, are generally useful. Those having two or three of such alkyl groups to each atom of tin are preferred.

The applicant has demonstrated that these alkyl tin sulfides, and particularly the di- and tributyl tin sulfides constitute efficient stabilizers against heat for halogenated vinyl resins. The quantity of stabilizer which is to be incorporated in order to obtain successful results is from 1% upward by weight, with respect to the weight of the resin. Below 1% the stability of the resin is adversely affected and above 5% an additional quantity of stabilizer does not produce a further improvement. However, it is to be noted that more than 5% of the alkyl tin halides can be introduced without deleterious effect upon the resin.

These stabilizers, when utilized as set forth herein, confer upon the resin a remarkable resistance to heat, preventing the decomposition of the resin even when it is subjected to relatively prolonged working at high temperature. This improvement in the heat resistance of vinyl resins, particularly vinyl chloride, permits the use with vinyl chloride of certain methods and apparatus of manufacture which were previously considered impracticable with unplasticized vinyl chloride or with vinyl chloride which has only been slightly plasticized. By means of this invention it is possible to mold polyvinyl chloride by injection with no plasticizer or with only those small degrees of plasticization with which injection molding was previously inadequate.

Alkyl tin sulfides have been previously described but their utility as stabilizers for resins was heretofore unknown. Trialkyl tin sulfides have the general formula

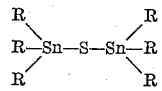

in which each R is an alkyl group. The dialkyl tin sulfides have a more complex formula, certain authors having thought it necessary to assign to them the formula of a cyclic trimer.

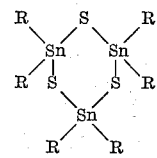

The known alkyl tin sulfides have heretofore been prepared by the action of sodium sulfide in hot alcoholic medium on iodides or bromides of di- or tri-alkyl tin.

The applicant has, as a part of this invention, a development of a new and improved process for preparing these alkyl tin sulfides, which includes the reaction of tri-alkyl or di-alkyl tin chlorides in aqueous medium with alkali metal mono or poly sulfides. In most cases the reaction proceeds readily at room temperature as there is great reactivity of the reagents in the aqueous medium but, in case it is desired to accelerate the reaction, heating can be employed.

I have also found that, when one used a poly sulfide and particularly an alkali metal di sulfide, the reaction is quicker than with a mono sulfide but that the alkyl tin sulfides obtained are the same. For examples, if one uses trialkyl tin chloride and sodium sulfide $Na_2S_2$ one has the reaction:

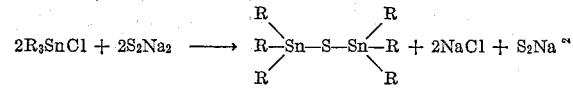

If one uses a dichloride or dialkyl tin, one obtains dialkyl tin sulfides which do not contain chlorine and which correspond to the cyclic formula given hereinabove.

Among the following examples, the first four and last four show the application of the new method of manufacture to the preparation of alkyl tin sulfides. The remaining examples illustrate various phases in the utilization of the alkyl tin sulfides for the stabilization of chlorinated vinyl resins.

*Example 1*

Into a flask provided with an agitator and from which a cooled reflux condenser projected, there was introduced one mole of sodium monosulfide (240 grs. of $Na_2S.9H_2O$), 170 grs. of water and 1 mole (325 grs.) of tributyl tin chloride. This was heated on the water bath at 90 to 95° C. with agitation for three hours.

After cooling, the product of the reaction separated into two liquid layers. The upper layer was colorless and comprised tributyl tin sulfide. It was separated from the other layer by decantation and washed three times with 200 cc. of water per washing. The product left after the last washing with water was dried under vacuum at water bath temperature. There was thus obtained 290 grs. of a colorless liquid which is tributyl tin sulfide, practically pure, having an index of refraction at 21° for ray D equal to 1.5180. The yield was 95% of that which is theoretically possible.

*Example 2*

Into a flask provided with a ground glass stopper there was introduced 1.25 mole (138 grs.) of sodium disulfide $Na_2S_2$ in the form of an aqueous solution of 25% concentration by weight, and 1.25 mole (406 grs.) of tribuytl tin chloride. The quantity of sodium disulfide in reaction is thus double the quantity theoretically necessary for the reaction. The receptacle was agitated at room temperature for three hours on the shaker. Thereafter the upper layer of liquid was decanted and washed four times with 250 cc. of water per washing and dried on the water bath as in Example 1, yielding 350 grs. of tributyl tin sulfide of the same index of refraction as that of Example 1. The yield was 90% of that which is theoretically possible.

*Example 3*

Sodium monosulfide, which was reacted at elevated temperature in Example 1, was employed at room temperature, employing equimolecular proportions of sodium monosulfide and tributyl tin chloride. There was produced tributyl tin sulfide having an index of refraction 1.517 at 19.5° with a yield of 85% with respect to that which is theoretically possible.

*Example 4*

Operating at room temperature in the apparatus of Example 1 but employing 2 moles (220 grs.) of sodium disulfide under the form of an aqueous solution of 25% concentration, and 1 mole (304 grs.) of dibutyl tin chloride, and heating for three hours on the water bath at 80 to 95° C., then cooling and decanting the upper layer, which was washed three times with 60 cc. of water at a temperature of 50° C. After the last washing the product was finally dried on the water bath. There was thus produced 47 grs. of dibutyl tin sulfide having an index of refraction at 16° for ray D equal to 1.5742. The yield is 79% of that which is theoretically possible. The same preparation carried at room temperature on the shaker, as in Example 2, yielded a product having an index of refraction 1.5680 with a yield of 80% of that which is theoretically possible.

The examples which follow are illustrative of the stabilization of polyvinyl chloride resins by means of the stabilizers of this invention, the stabilizers employed being di or tributyl tin, which have been found to be especially efficacious.

*Example 5*

A mixture of 100 parts by weight of polyvinyl chloride, .5 part by weight of octadecenamide of high melting point used as a lubricant, and 3 parts by weight of tributyl tin sulfide obtained by the process of Example 1 were worked on the roll mills for 10 mins. at 165° C. The roll mills produced a sheet of 0.5 mm. in thickness. This sheet was cut up into test pieces which were subjected at standard testing pressure at 200° C. during different periods of time which increased from one test piece to the next. It was thus shown that 20 to 22 mins. passed, under these test conditions, before one could observe on the test pieces the appearance of that brown coloration which indicates the beginning of decomposition. Thereafter, one superimposed seven test sheets cut from the same original sheets and pressed them between two polished plates at 170° C. for 10 mins., producing a plate 3 mm. thick which was suitable for the evaluation of transparency and color of the stabilzed resin. The plate was colored yellow-orange, and was perfectly transparent, which is not the case for identical plates, prepared under the conditions prevailing in the prior art, and which included stabilizers such as lead stearate, subjected to identical test conditions.

*Example 6*

On the roll mills there was prepared a sheet of polyvinyl chloride 2 to 3 mm. thick, stabilized by the method of this case. This sheet was cut up into small pieces and the small pieces were fed to an extrusion machine the die of which extruded a tube 14 to 16 mm. in diameter. The temperature of the body of the extruding machine was 165° C. at the intake, 175° C. at the middle, 195° C. at the point where it entered the die and the die itself was at 215° C. Under these circumstances it was possible to extrude a rigid transparent tube colored yellow-orange.

*Example 7*

Five kgs. of molding powder was prepared by mixing on the roll mills 90 parts by weight of powdered polyvinyl chloride, 10 parts by weight of octyl phthalate, 3 parts by weight of tributyl tin sulfide prepared according to the process of Example 2, and .5 part of octadecenamide of high melting point. The sheet extracted from the roll mills were thereafter macerated. The powder of the maceration was fed to an injector press which developed a pressure of 970 kgs. per sq. cm., the body thereof was maintained at a temperature such that the material issued at 195 to 200° C. after 16 to 17 mins. in the body. The jelled mixture was then injected into a mold in the form of a cupel maintained at a temperature of 75 to 80° C., at a molding rate of 42 grs. per min. The molded cupels were extracted from the mold as completed. After cooling they constituted rigid cupels perfectly transparent, colored clear yellow. It was possible to use the press under these conditions for 55 mins. without there appearing any signs of decomposition of the resin in the press. This constitutes a material improvement over the performance of the prior art.

*Example 8*

An aqueous solution of sodium disulfide containing 55 grs. (25% by weight) of the disulfide was agitated in a flask for three hours at room temperature with 142 grs. of tripropyl tin chloride. After settling, the upper layer was decanted, washed with water several times, and dried under vacuum. 119 grs. of a limpid, colorless, chlorine-free product were obtained in 90% yield. It is di(tripropyl) tin sulfide of the formula $(CH_3-CH_2-CH_2)_3 \equiv Sn-S-Sn \equiv (CH_2-CH_2-CH_3)_3$

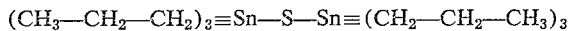

*Example 9*

Into a flask were put 85 grs. water, 120 grs. of hydrated sodium sulfide, $Na_2S.9H_2O$, comprising ½ mol of $Na_2S$, and 121 grs. (½ mol) of triethyl tin chloride. It was agitated 3 hours at room temperature. After settling, the upper layer was decanted, washed, and dried under vacuum. There were 99 grs. of a liquid composed of di-triethyl tin sulfide of the formula:

$(CH_3-CH_2)_3 \equiv Sn-S-Sn \equiv (CH_2-CH_3)_3$

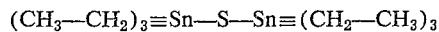

The yield was 87%.

*Example 10*

110 grs. (1 mol) of $Na_2S_2$ in water, at 25% concentration, and 124 grs. (½ mol) of diethyl tin dichloride were agitated as in Example 8 and decanted, washed and dried. 87 grs. of diethyl tin sulfide, at a yield of 83%, was produced. The formula is $[(CH_3CH_2)_2SnS]_n$, which may be the cyclic trimer above.

*Example 11*

A mixture of 1 mol of $Na_2S_2$ (110 grs.) in 25% concentration in water was agitated 3 hours at room temperature with ½ mol of dichlorodipropyl tin (137 grs.), decanted, washed, and dried, producing 96 grs. (82% yield) of colorless, limpid dipropyl tin sulfide.

As many apparently widely different embodiments of the present invention may be made without departing from the spirit and scope thereof, it is to be understood that the invention is not limited to the specific embodiments.

What is claimed is:

1. The method of preparing tributyl tin sulfides that comprises reacting sodium monosulfide and tributyl tin chloride in aqueous medium at a temperature between room temperature and 100° C., cooling the reaction product to ambient temperature and separating the tributyl tin sulfide therefrom.

2. The method of preparing tributyl tin sulfides that comprises mixing about equi-molar amounts of sodium disulfide and tributyl tin chloride in aqueous medium, separating the tributyl tin sulfide from the remainder of the reaction product, washing it and drying it.

3. The method of claim 1 in which the reaction is carried out at room temperature.

4. The method of making dibutyl tin sulfides that comprises reacting sodium disulfide and dibutyl tin chloride in aqueous medium, in a molar ratio of about 2 moles of disulfide to 1 of chloride, heating for about three hours at a temperature between room temperature and 100° C., cooling the reaction product to ambient temperature and separating the dibutyl tin sulfide therefrom.

5. The process of claim 4 in which the reaction is carried out at room temperature with agitation.

6. The process of making polybutyl tin sulfides that comprises reacting a polybutyl tin chloride and an alkali metal sulfide in aqueous medium at a temperature between room temperature and 100° C. and separating the polybutyl tin sulfide from the reaction product.

References Cited in the file of this patent

UNITED STATES PATENTS

| | | |
|---|---|---|
| 2,746,946 | Weinberg et al. | May 22, 1956 |
| 2,789,103 | Weinberg et al. | Apr. 16, 1957 |
| 2,832,753 | Weinberg et al. | Apr. 29, 1958 |

OTHER REFERENCES

Krause et al.: "Die Chemie der Metall-Organischen Verbindungen," Edwards Brothers, Inc., Ann Arbor, Michigan (1943), page 328.

Harada et al.: "Scientific Papers of The Institute of Physical and Chemical Research," vol. 42, page 60, 1947.